July 4, 1939.  J. C. CAMPBELL  2,164,900
DYNAMIC BALANCER FOR MACHINE TOOLS
Filed Aug. 12, 1937  2 Sheets-Sheet 1

INVENTOR.
JOHN C. CAMPBELL
BY
*A. K. Parsons*
ATTORNEY.

July 4, 1939.   J. C. CAMPBELL   2,164,900
DYNAMIC BALANCER FOR MACHINE TOOLS
Filed Aug. 12, 1937   2 Sheets-Sheet 2

INVENTOR.
JOHN C. CAMPBELL
BY
AHH Parsons
ATTORNEY.

Patented July 4, 1939

2,164,900

UNITED STATES PATENT OFFICE 2,164,900

DYNAMIC BALANCER FOR MACHINE TOOLS

John C. Campbell, Cincinnati, Ohio, assignor to Cincinnati Grinders Incorporated, Cincinnati, Ohio, a corporation of Ohio Application August 12, 1937, Serial No. 158,731

9 Claims. (Cl. 51—169)

This invention relates to improved means for dynamically balancing machine tools.

One of the objects of this invention is to provide a simplified dynamic balancing mechanism which may be built into the spindle of a machine tool whereby the rotating parts may be balanced in situ in the machine.

Another object of this invention is to provide improved means for manually balancing the spindle assembly of a machine tool while the same is rotating.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 9 is an end view of a vibration indicator as viewed on the line 9—9 of Figure 1.

Figure 1:
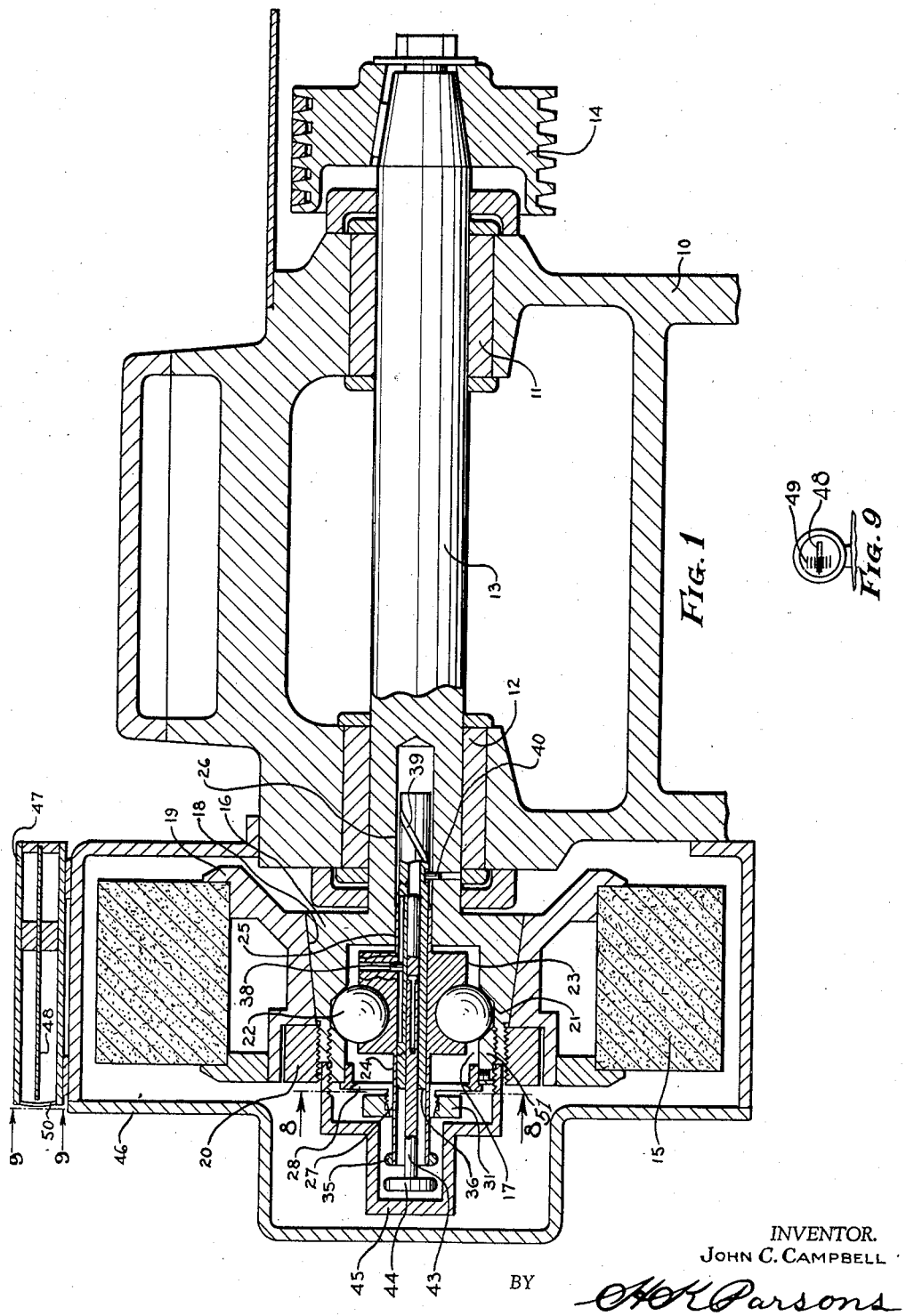
Figure 1 is a section through the spindle assembly of a machine tool showing the application of this invention thereto.

In Figure 1 of the drawings there is shown a section through the spindle of a machine tool in which the reference numeral 10 indicates the base or frame of the machine tool having bearings 11 and 12 in which is rotatably mounted a spindle 13. For illustrative purposes this spindle may be assumed to be the main spindle of a grinding machine having a driving pulley 14 on one end and means for supporting a grinding wheel 15 on the other end.

Grinding machines offer a good example of a machine tool in which the main spindle assembly often becomes out of balance due to the fact that grinding wheels wear away and thus get out of balance due to uneven removal of weight and also because the wheels are frequently changed either as replacement for worn out wheels or to substitute wheels having different characteristics more suitable to the work in hand.

Regardless of the cause, any out of balance in the spindle assembly of such a machine causes inaccuracies in the work as well as producing a poor finish thereon, and in addition is detrimental to the bearings of a machine which must maintain a relatively high degree of precision.

This invention contemplates a balancing mechanism which may be built into the machine whereby the spindle asembly thereof may be balanced in situ at any time that there are indications of unbalance in the structure. To this end the spindle 13 is provided with an enlarged end 16 in which is formed a cylindrical bore 17. The outside of the end 16 is provided with a tapered surface 18 for receiving the grinding wheel collet 19 which is held in position by the locking ring 20.

The interior of the bore 17 is provided with an annular groove or raceway 21 which serves as a guide for the balancing weights 22 which in the present instance is in the form of balls. The weights are held in the groove by a cage 23 which has tubular ends 24 and 25 projecting axially therefrom. These tubular portions serve to support the cage for rotative and axial movement, and the end 25 projects into a bore 26 which is formed co-axially with respect to the cylindrical bore 17, and the end 24 is supported in a bore 27 formed in a closure cap 28 which is mounted in the open end of the cylindrical bore 17.

The cap member 28 has a kerf 29 cut therein whereby portions of the boss 30 through which the bore 27 is formed may be drawn together by a clamping nut 31 for the purpose of locking the cage against relative movement with respect to the spindle.

Figure 2:
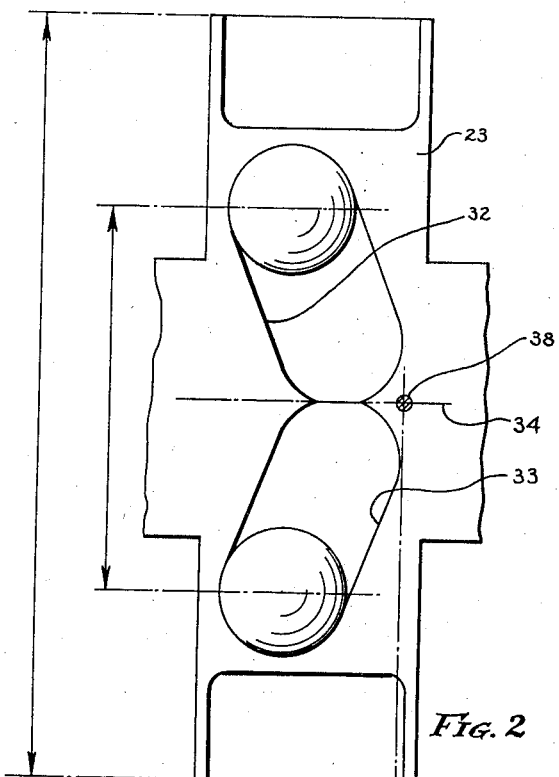
Figure 2 is a view of the balancing weight cage which has been rolled out to show the relationship of the grooves therein.
Figure 6:
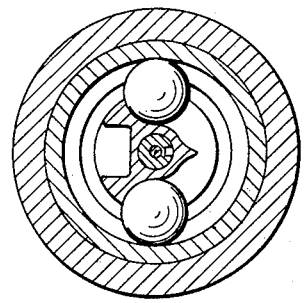
Figure 6 is a cross sectional view showing the balancing weights in an ineffective position.
Figure 7:
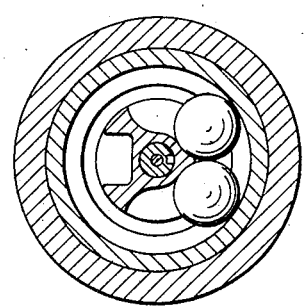
Figure 7 is a cross sectional view showing the balancing weights in a position to effect the maximum amount of correction.

The cage 23, as shown in Figure 2, has a pair of spiral grooves 32 and 33 formed therein and which extend circumferentially in opposite directions from a predetermined center line 34 and are of opposite hand. These grooves are of sufficient circumferential extent that the weights may be moved from a 180° relationship in which they are shown in Figure 6 and in which position they produce zero correction, to a position adjacent one another as shown in Figure 7 in which they effect a maximum amount of correction.

The purpose in making the grooves of opposite hand is that since the raceway 21 is annular and therefore lies in one cross sectional plane, that the cage may be moved laterally or, in other words, in an axial direction as respects the spindle 13 to cause the weights to be moved toward and from one another. In other words, the unbalance correction effected by the weights is gradually increased as the weights are moved toward one another. Since the outer raceway remains in one plane, it tends to hold the weights in that plane and by moving the cage laterally, as to the left as viewed in Figure 2, the spiral grooves 32 and 33 will necessarily have a wedging action causing the weights to approach one another. In order to effect this correction while the spindle is rotating, the tubular end 24 of the cage is projected beyond the cap member 28 and provided with a manual operating means 35 in the form of a knurled ring which is loose on the end of the tubular portion 24 so that the cage may be rotating while the adjustment is being made.

Figure 3:
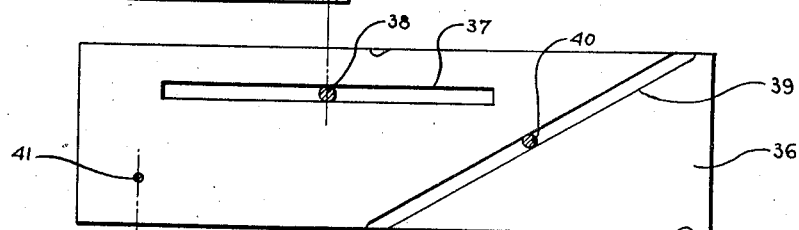
Figure 3 is a rolled out view of the actuating sleeve showing the nature of the grooves therein.
Figure 4:
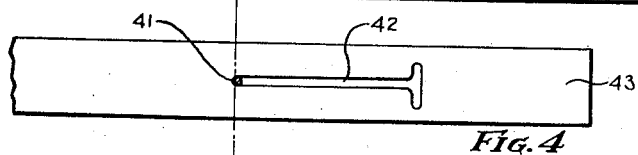
Figure 4 is a detail view of the control rod.

The foregoing adjustment produces the same effect as adding weight to one side of the spindle assembly. It is necessary, however, that this counterbalancing effect be applied to the light side of the spindle and even although the amount of weight necessary for balancing may be determined by lateral movement of the sleeve, it is necessary that it be applied to the correct side of the spindle. Means have therefore been provided for rotating the cage relative to the spindle and during rotation thereof, whereby the corrective effect may be applied to the light side of the spindle. This means comprises a sleeve 36 which is telescopingly mounted in the central bore of the cage, and this sleeve, as shown in Figure 3, has a longitudinal keyway 37 for receiving a pin 38 which is integral with the cage, as shown in Figure 1, and a spiral groove 39 for receiving a pin 40 which is integral with the spindle. The sleeve also has a pin 41 which is integral with the sleeve and projects into a bayonet slot 42 formed in the periphery of an operating rod 43, as shown in Figure 4. The rod 43 extends axially beyond all the other parts and is provided with a manual control 44 whereby the rod may be shifted in an axial direction.

Figure 5:
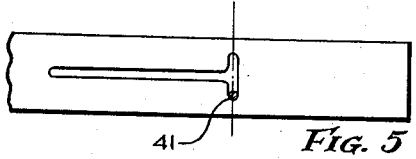
Figure 5 is a detail view showing the control rod in an operating position.
Figure 8:
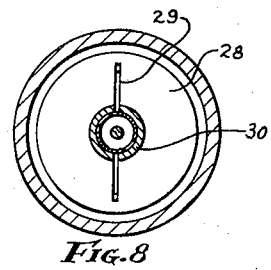
Figure 8 is a detail section on the line 8—8 of Figure 1.

Since the pin 40 is integral with the spindle, it in turn rotates the sleeve, and the sleeve in turn rotates the cage through the medium of the pin 38, and in addition, the sleeve rotates the control rod 43 through the medium of the pin 41, with the result that all of these parts rotate as a unit with the spindle. In spite of the fact that all of these parts are rotating as a unit, angular adjustment between the cage and the spindle is effected by pulling the rod 43 in an axial direction until the pin 41 is in alignment with the cross slot, as shown in Figure 5, whereby the pin will move in one direction or the other in the cross slot depending upon the direction of rotation of the sleeve since the sleeve is the driving member for the rod. When this has been effected, axial movement of the rod will effect axial movement of the sleeve relative to the spindle. Since the pin 40 is fixed with the spindle, it will be apparent from Figure 3 that longitudinal movement of the sleeve in one direction or the other will cause rotation thereof, and due to the connecting pin 38, rotation of the sleeve will cause rotation of the cage but without causing axial movement thereof, due to the fact that the slot 37 extends in the direction of the axial component of movement of the sleeve. It thus becomes possible to move the cage laterally by means of the manual control 35 to vary the amount of angular separation between the weights, and to change the effective position of the weights angularly with respect to the spindle without disturbing the angle of separation between them.

After the necessary correction has been made, the operator grasps the nut member 31 and holds it against rotation, whereby the rotating cap member 28 will cause the nut to tighten up and grip the projecting portion 24 of the cage. This will serve to lock the cage sufficiently so that the parts will not get out of adjustment while the spindle is being stopped, after which the nut 31 may be tightened more securely by a wrench or other suitable means. As a protection to these parts a cover plate 45 may be provided and threaded onto the end of the outer race closure or ball retaining sleeve 51 which, in turn, is threaded into the enlarged portion of the spindle, as shown in Figure 1.

For the purpose of assisting the operator in effecting this balance, the wheel guard 46 may have attached to it a vibration indicator 47 which contains a resilient member such as a vibratory reed 48, the end of which is relatively movable with respect to graduations 49 on a glass 50 mounted in the end of the instrument, as shown in Figure 9. It will be obvious that the balancing weights are adjusted until no perceptible movement between the reed and the graduation marks is apparent, which will thus indicate that the assembly is in balance.

There has thus been provided an improved and simplified mechanism whereby the spindle assembly of a machine tool may be readily and easily balanced in situ in the machine and by an operator thereof who is unfamiliar with dynamic balancing principles.

I claim:

1. In a grinding machine having a spindle and a grinding wheel detachably connected thereto, the combination of means for dynamically balancing the assembled wheel and spindle, including a pair of balancing weights, an internal annular groove in the spindle forming a raceway for said weights, a cage having peripheral spiral grooves for receiving said weights, and means to axially shift said cage with respect to said spindle and during rotation thereof to positively change the angular relation between said weights and thereby the counterbalancing effect thereof.

2. In a grinding machine having a spindle and means for detachably connecting a grinding wheel therewith for rotation thereby, the combination of means for dynamically balancing the assembled wheel and spindle, including a pair of balancing balls, an internal annular raceway formed in said spindle for receiving said balls, a cage having opposite handed peripheral spiral grooves for receiving the respective balls, and means to support the cage in the spindle for rotative and axial adjustment whereby the angular position of said weights about said spindle and the angular relation between said weights may be varied.

3. In a grinding machine having a power driven spindle and a grinding wheel detachably connected thereto, the combination of means for dynamically balancing the assembled grinding wheel and spindle, including a pair of balancing weights, an internal annular raceway formed in said spindle for said weights, a cage supported for axial and rotative movement by said spindle and having opposite handed spiral grooves formed in the periphery thereof for receiving said weights, manually operable means carried by the end of the spindle for axially shifting said cage to change the angular relation between said weights, and additional manually operable means carried by the end of said spindle for rotating said cage to change the angular relation of said weights with respect to said spindle and without disturbing the angular relation therebetween.

4. In a grinding machine having a rotatable spindle and a grinding wheel attached thereto for rotation thereby, the combination of means for dynamically balancing the assembled wheel and spindle, including a pair of balancing weights, a first mechanism for positively changing the position of said weights relative to said spindle, additional mechanism for positively changing the angular position between said weights, manually operable means carried by the end of said spindle for actuating said mechanisms, and additional means to lock said weights in a finally adjusted position and during rotation of said spindle.

5. Means for dynamically balancing the assembled tool and spindle of a machine tool during rotation thereof, including a pair of balancing weights, members having cooperating annular and spiral grooves for receiving said weights, said annular groove lying in the plane of rotation of said tool, means to rotate one of said members relative to the other to positively change the position of said weights simultaneously about the axis of said spindle, and means to shift one of said members axially with respect to the other to positively change the angular relation between said weights.

6. In a grinding machine having a spindle and a grinding wheel attached thereto, the combination of means for dynamically balancing the assembled wheel and spindle, including a pair of balancing weights, said spindle having a cavity formed in the end thereof for receiving said weights, a cage for the weights having tubular ends supporting the cage in said spindle for axial and rotative movement relative thereto, said cage and spindle having cooperating annular and spiral grooves for guiding said weights, a sleeve rotatably and slidably mounted within said cage, manually operable means attached to one of said tubular ends for shifting said cage axially to thereby change the angular relation between said weights, a manually operable rod operatively connectible with said sleeve for causing axial movement thereof, positive means for causing rotation of said sleeve upon axial movement thereof, and an operative connection between said sleeve and cage for imparting rotation thereto whereby the position of said weights about the axis of said spindle may be varied.

7. In a machine tool structure having spaced, aligned bearings adapted rotatably to support a tool spindle, a dynamically balanceable tooling member including a spindle having journal portions engageable within the bearings and an enlarged hollow terminal portion providing an interior chamber and an exterior tapered tool receiving stud, said chamber having a circumferential raceway formed therein, and a balancing mechanism contained within the chamber including balancing weights circumferentially shiftable in the raceway, a control member mounted within the chamber and including a cage having helically disposed tracks of opposite angle engaging respective balancing weights whereby longitudinal movement of the cage will effect circumferential movement of the weights in the raceway to vary their angular relationship, means for effecting longitudinal shifting of said cage, additional means for effecting rotative movement of the cage for joint circumferential adjustment of the weights within the raceway and means for locking the cage in adjusted position to maintain the weights in selected shaft balancing position.

8. A grinding machine spindle structure of the character described including an axially extending cylindrical bearing engaging portion, having an enlarged head at one end thereof exteriorly formed to receive a grinding wheel collet and having an enlarged interior chamber formed therein, the circumscribing wall of said chamber having an annular raceway formed therein, a balancing mechanism insertable in said chamber and including a cage having divergent, semi-circumferential helical tracks exteriorly formed therein, balancing weights mounted in said tracks and engageable in the raceway of the chamber, a retaining sleeve having an exterior threaded portion interengaged with the enlargement of the spindle for retaining the cage and weights in position within the chamber, means for effecting axial non-rotative shifting of the cage with respect to the spindle, whereby the reaction of the raceway and grooves will cause relative approach or separation of the balancing weights, means for effecting rotative movement of the cage, whereby cooperative action of the grooves and raceway will maintain the balancing weights in predetermined relative position to each other while varying their circumferential relation to the spindle, and means for locking the parts in selected adjusted position.

9. A grinding machine spindle structure of the character described including an axially extending cylindrical bearing engaging portion, having an enlarged head at one end thereof exteriorly formed to receive a grinding wheel collet and having an enlarged interior chamber formed therein, the circumscribing wall of said chamber having an annular raceway formed therein, a balancing mechanism insertable in said chamber and including a cage having divergent, semi-circumferential helical tracks exteriorly formed therein, balancing weights mounted in said tracks and engageable in the raceway of the chamber, a retaining sleeve having an exterior threaded portion interengaged with the enlargement of the spindle for retaining the cage and weights in position within the chamber, means for effecting axial non-rotative shifting of the cage with respect to the spindle, whereby the reaction of the raceway and grooves will cause relative approach or separation of the balancing weights, means for effecting rotative movement of the cage, whereby cooperative action of the grooves and raceway will maintain the balancing weights in predetermined relative position to each other while varying their circumferential relation to the spindle, and means for locking the parts in selected adjusted position, said threaded retaining sleeve having a portion projecting axially with respect to the spindle enlargement, and a closure for the chamber and contained balancing mechanism having an interiorly threaded portion mounted on said projection of the sleeve.

JOHN C. CAMPBELL.